(No Model.)  3 Sheets—Sheet 1.

J. PHELAN.
MACHINE FOR MAKING LINKS.

No. 283,919. Patented Aug. 28, 1883.

Witnesses
Y. F. Davison
Ino. K. Smith

Inventor
John Phelan
by his attys
Bakewell & Kerr (No Model.)  3 Sheets—Sheet 3.

J. PHELAN.
MACHINE FOR MAKING LINKS.

No. 283,919.  Patented Aug. 28, 1883.

Witnesses
F. F. Davison.
Jno. K. Smith.

Inventor
John Phelan
by his attys
Bakewell & Kerr

UNITED STATES PATENT OFFICE.

JOHN PHELAN, OF PITTSBURG, PA., ASSIGNOR TO HIMSELF, AND ROBERT H. LYON AND WILLIAM ACHESON, BOTH OF SAME PLACE.

MACHINE FOR MAKING LINKS.

SPECIFICATION forming part of Letters Patent No. 283,919, dated August 28, 1883.

Application filed April 19, 1883. (No model.)

*To all whom it may concern:*

Be it known that I, JOHN PHELAN, of Pittsburg, in the county of Allegheny and State of Pennsylvania, have invented a new and useful Improvement in Machines for Making Links; and I do hereby declare the following to be a full, clear, and exact description thereof, reference being had to the accompanying drawings, forming part of this specification, in which—

Figure 1:
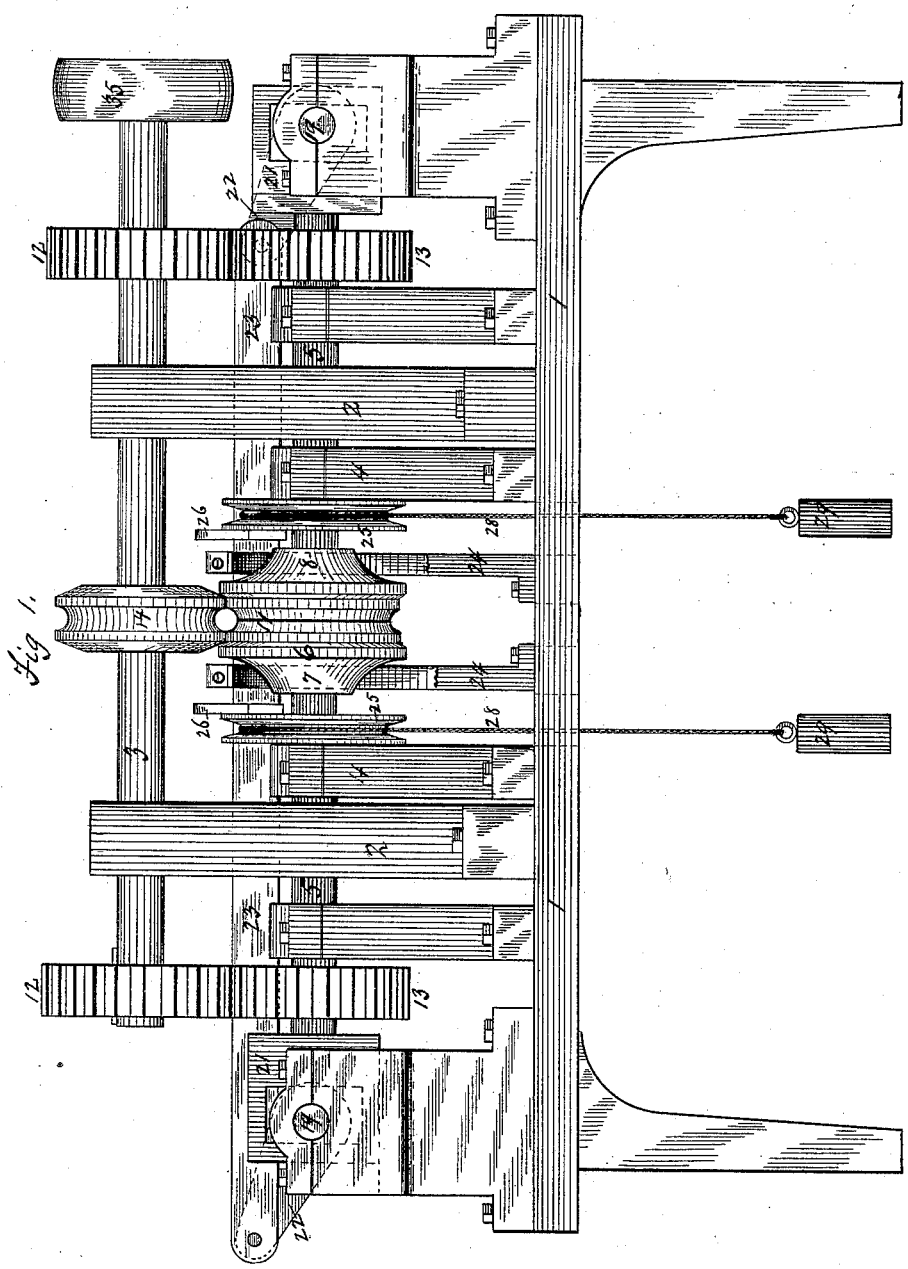
Figure 2:
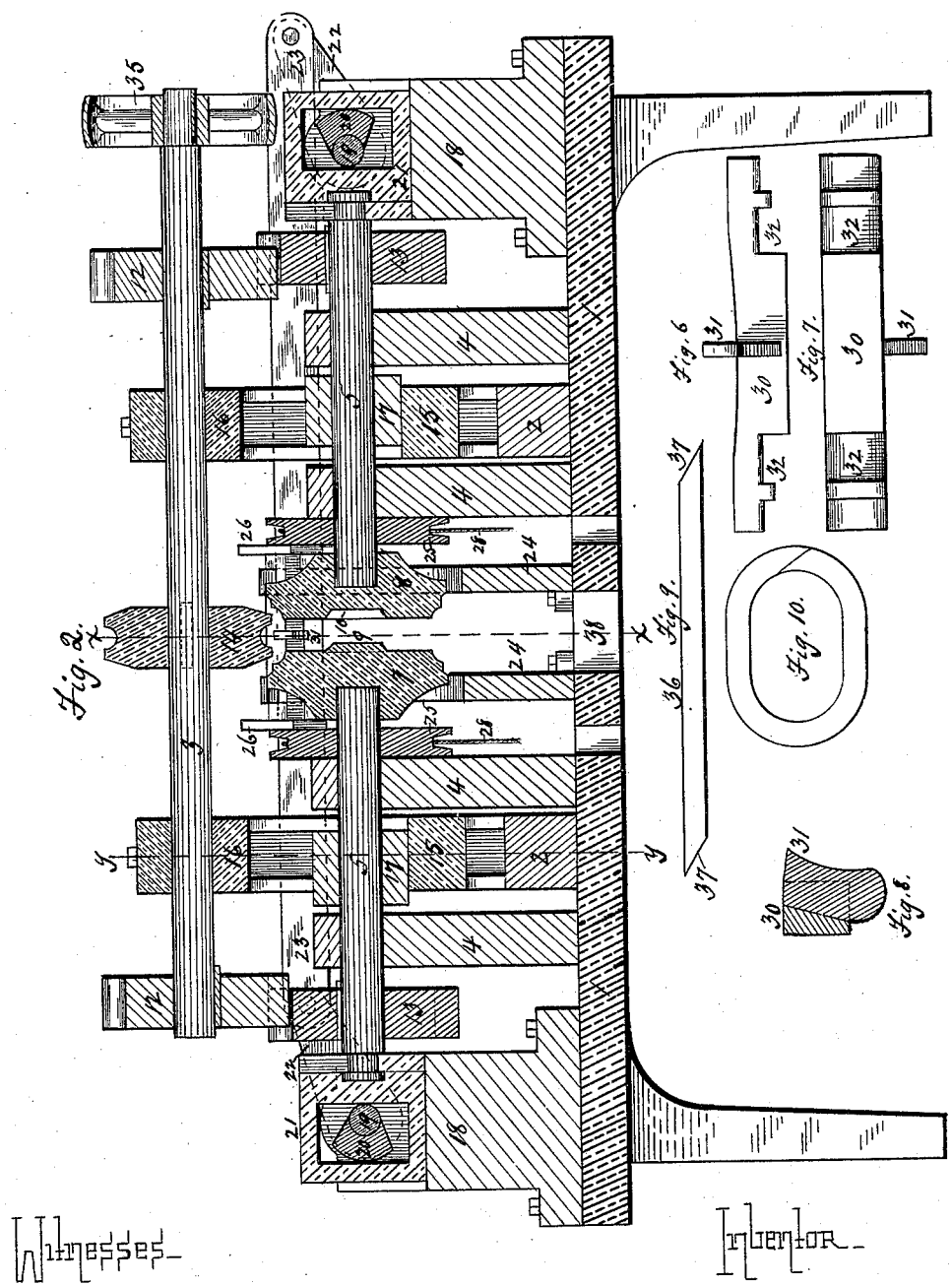
Figure 3:
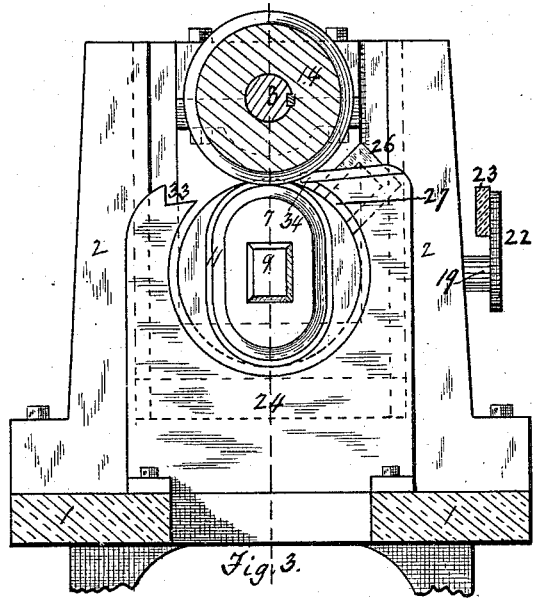
Figure 4:
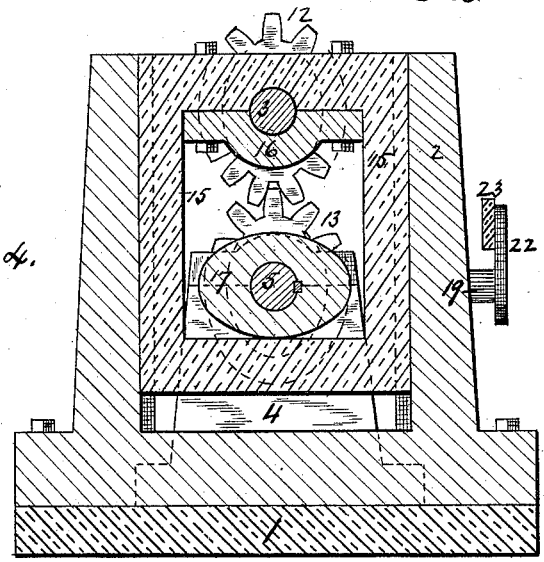
Figure 5:
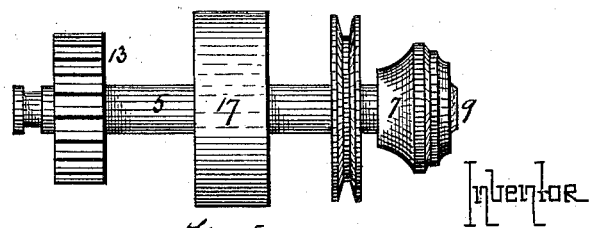

Figure 1 is an elevation of my improved machine on the feed side, with a portion of the curved guides 24 broken away for greater clearness of illustration. Fig. 2 is a longitudinal vertical section of the machine, showing the partible mandrel open. Fig. 3 is a vertical cross-section on the line $x\, x$ of Fig. 2. Fig. 4 is a vertical cross-section on the line $y\, y$ of Fig. 2. Fig. 5 is a side view of one of the mandrel-shafts. Figs. 6, 7, and 8 are views of the gripper-bar. Fig. 9 is a view of the blank. Fig. 10 is a view of the bent and welded link.

Like letters of reference indicate like parts in each.

The machine is provided with a suitable bed-plate, 1, upon which are vertical housings 2 for the power-shaft 3, which shaft is provided with a pulley, 35, or other suitable means for applying power thereto. Below the power-shaft 3, and extending parallel thereto, are two mandrel-shafts, 5, which have their bearings in suitable housings or bearing-blocks, 4, there being two for each mandrel-shaft, such housings being placed one on each side of each housing 2 of the power-shaft. The mandrel 6 is composed of two parts, which are mounted on the adjacent ends of the mandrel-shafts 5. Each part 7 and 8 of the mandrel contains one-half of the groove in which the link is formed, and they are centered together by a projection, 9, on the part 7, which enters a recess, 10, on the part 8. When the two parts 7 and 8 are brought together, the groove 11 is formed between them. On the power-shaft 3, directly over the groove 11 of the mandrel, is a round forming-roller or follower, 14, having a groove in its periphery, which conforms to the shape of the upper side of the blank of which the link is formed.

Mounted on the power-shaft are elliptical gear-wheels 12, and directly below and gearing into them are similar elliptical gear-wheels, 13, on the mandrel-shaft 5. These gear-wheels conform in their general shape in cross-section to the shape of the mandrel in cross-section, so that when the mandrel is caused to rotate under the wheel or roller 14 the latter shall always bear on its periphery. The bearings 16 of the power-shaft 3 are mounted on sliding frames 15, which move vertically in guides in the housings 2.

On the mandrel-shaft 5 are cams 17, of elliptical form, their long diameters being arranged at right angles to the long diameters of the elliptical gearing and mandrel. These cams, operating in conjunction with the sliding frames, cause the power-shaft 3 to rise and fall as the longer and shorter diameters of the crank come into conjunction with each other, and thus enable the roller 14 to always be in contact with the periphery of the elliptical mandrel.

Mounted in bearings in the frames 18 at the ends of the machine are lateral shafts 19, upon which are cams 20, and on the outer ends of the mandrel-shafts are cam-yokes 21, in which the cams 20 operate. These cams are designed to give an axial motion to the mandrel-shafts 5 at certain periods in the operation of the machine for the purpose of bringing together and separating the two parts 7 and 8 of the mandrel to adapt the mandrel to form the link, and also allow the bent and welded link to be discharged therefrom. On the outer ends of the shafts 19 are cranks 22, which are connected together by a bar, 23.

Secured to the bed-plate, between the inner housings, 4, are curved guides 24, the faces of which are concentric with a circle described by a radius of the mandrel.

On the mandrel-shaft, just outside of the curved guides 24, are two loose grooved wheels, 25, each of which is provided with an arm, 26, projecting radially beyond the periphery of the wheels, which arms are slotted, as at 27. Secured in the groove of each wheel 25 is a chain or cord, 28, provided at its outer end with a weight, 29. A gripper-bar, 30, having recesses 32 on its outer face, rests by said recesses upon the curved guides 24, while the free ends, which project beyond the guides 24, pass through the slots 27 of the arms 26, so that when the bar is moved upon the guides it causes the wheels 25 to be turned, winding up the weighted cord 28, and when the wheels are reversely turned by the unwinding of the cords 28 they cause the bar to be moved on the guides.

The bar 30 is provided with a gripper-finger, 31, which projects into the groove 11 of the mandrel. At the rear ends of the curved guides 24 are recesses 33 for receiving the bar 30 at one end of its movement, and at the front end of the guides are stops 34 for stopping the bar at the other end of its movement.

Thus constructed the operation of my improved machine is as follows: A straight bar or blank, 36, having scarfed edges 37, is used. This blank is of the proper length to form the link when it is bent, and the two scarfed ends 37 are laid together and welded, the form of the blank in cross-section at the point of weld being the same as that at any other point. The parts of the machine being in the position shown in Fig. 1, the blank 36 is inserted into the groove 11, with the point 37 downward. As the mandrel 6 and roller 14 turn, the end of the blank comes under the gripper-finger 31, and as the finger is held down in the groove by the gripper-bar 30 moving in curved guides 24, the bar will be swept onward before the blank around the curved guides, and the finger 31, holding the end of the blank tightly against the face of the mandrel, will cause it to keep its position in the groove 11. The roller 14 bends the blank from a straight form to one which conforms to the shape of the mandrel 6. Thus the blank is caused to wrap around or form a collar in the groove of the mandrel. When the bar 30 reaches the rear ends of the curved guides 24, being no longer held against the surface of the mandrel, the ends of the bar 30 being of course still retained and controlled by the slots 27 of arms 26, it is thrown backward into the recesses 33 at the rear ends of the guides, which are so arranged relatively to the pass that the forward end of the blank is delivered into the pass between the mandrel and the roller 14 at the instant when it is released by the gripper-finger 31. At the same instant the scarfed rear end of the blank is laid down upon the scarfed front end of the blank, and the two ends are welded by passing together between the roller 14 and the mandrel 6, the longer diameter of the latter being at this instant in conjunction with the diameter of the former, as shown in Fig. 3. The machine is then permitted to make several revolutions with the blank still on the mandrel for the purpose of more perfectly welding it and of finishing it. Then the two parts 7 and 8 of the mandrel are separated by throwing the mandrel-shafts 5 backward by moving the bar 23, and thereby operating the cams 20 by means of the shafts 19 and cranks 22. When the finished link is released from the mandrel in this way, it drops down through the discharge-opening 38, made in the bed of the machine directly under the mandrel. The two parts 7 and 8 of the mandrel are then brought together again by restoring the bar 23 to its normal position, after which the operator pushes the gripper-bar 30 out of the recesses 33 onto the curved guides 24 by the use of any suitable tool, where, being unsupported, it will be restored to its normal position against the stops 34 at the rear side of the machine by the descent of the weights 29, operating through the radial arms 26.

I have described my invention as applied to the formation of elongated links; but I do not limit myself to such use, as by altering the form of the gearing and the mandrel I can make round links with equal facility. Such alteration of the gearing and mandrel would enable me to dispense with the sliding frames which carry the bearings of the power-shaft, and with the cams which operate the same. Nor do I limit myself to a mandrel in which both parts have an axial movement on their shafts, because I can use a two-part mandrel, one-half of which is held in a stationary position. I however prefer the form shown and described.

It is apparent to the skilled constructer that the form and arrangement of many of the parts may be varied, and I do not therefore limit myself to the precise construction and arrangement shown.

What I claim as my invention and desire to secure by Letters Patent, is—

1. In a machine for bending, shaping, and welding links, the combination of a grooved centrally-separable rotating mandrel and a grooved forming-roll arranged to coact with the transversely-separable mandrel, substantially as and for the purpose specified.

2. A mandrel for making links, formed of two parts centered with each other by a projection on one part entering a corresponding recess in the other part, substantially as and for the purposes described.

3. The combination, in a machine for bending and welding links, of a mandrel divided in two parts capable of separating to discharge the link, a forming-roller operating in conjunction with said mandrel, and a gripping device for seizing the forward end of the link and holding it to the mandrel during its revolution, substantially as and for the purposes described.

4. The combination, in a machine for bending and welding links, of an elliptical mandrel mounted on suitable shafts, with a forming-roller mounted on the driving-shaft, and elliptical gearing connecting the said shafts, substantially as and for the purposes described.

5. The combination, in a machine for bending and welding links, of an elliptical mandrel mounted in suitable boxes, a driving-shaft mounted in movable bearings and provided with a forming-roller to operate in conjunction with the mandrel, elliptical gearing connecting the said shafts, cams, the longer diameter of which is at right angles to the longer diameter of the gearing and mandrel, mounted on the mandrel-shaft, and cam-yokes sustaining the bearings of the driving-shaft operated by said cams, substantially as and far the purposes described.

6. The combination of the partible mandrel and the mandrel-shafts with crank-shafts and cam mechanism arranged laterally thereto for the purpose of opening and closing the mandrel, substantially as and for the purposes described.

7. The combination of the mandrel and curved guides encircling the same with a gripper-bar traveling in said guides, provided with a finger to engage the forward end of the blanks, substantially as and for the purposes described.

8. The combination of the mandrel, curved guides, and gripper-bar traveling in said guides, with wheels mounted loosely on the mandrel-shafts, and provided with radial arms which engage the ends of the gripper-bar, and chains and weights for restoring the gripper-bar to its normal position, substantially as and for the purposes described.

9. The combination of the mandrel and gripper-bar with the curved guides provided at their front ends with stops and at their rear ends with recesses, substantially as and for the purposes described.

In testimony whereof I have hereunto set my hand this 29th day of March, A. D. 1883.

JOHN PHELAN.

Witnesses:
    W. B. CORWIN,
    T. B. KERR.